US008665985B1

(12) United States Patent
Piesinger

(10) Patent No.: US 8,665,985 B1
(45) Date of Patent: Mar. 4, 2014

(54) SECONDARY COMMUNICATION SIGNAL METHOD AND APPARATUS

(71) Applicant: Gregory Hubert Piesinger, Cave Creek, AZ (US)

(72) Inventor: Gregory Hubert Piesinger, Cave Creek, AZ (US)

(*) Notice: Subject to any disclaimer, the term of this patent is extended or adjusted under 35 U.S.C. 154(b) by 0 days.

(21) Appl. No.: 13/904,326

(22) Filed: May 29, 2013

(51) Int. Cl.
H04L 27/34 (2006.01)

(52) U.S. Cl.
USPC .......................................................... 375/268

(58) Field of Classification Search
CPC .................................... H04L 27/3405
USPC .......................................................... 375/268
See application file for complete search history.

(56) References Cited

U.S. PATENT DOCUMENTS

| 3,870,828 | A * | 3/1975 | Saliga | 370/527 |
| 4,039,961 | A * | 8/1977 | Ishio et al. | 329/308 |
| 6,175,389 | B1 * | 1/2001 | Felts et al. | 348/663 |
| 6,275,509 | B1 * | 8/2001 | Schlosser et al. | 370/527 |
| 7,173,981 | B1 * | 2/2007 | Chen et al. | 375/322 |
| 7,245,671 | B1 * | 7/2007 | Chen et al. | 375/316 |
| 8,031,105 | B2 * | 10/2011 | Stayton | 342/36 |
| 8,098,773 | B1 * | 1/2012 | Piesinger | 375/341 |
| 8,437,431 | B1 * | 5/2013 | Piesinger | 375/324 |
| 2003/0214436 | A1 * | 11/2003 | Voor et al. | 342/418 |
| 2004/0093194 | A1 * | 5/2004 | Singh et al. | 703/2 |
| 2007/0071134 | A1 * | 3/2007 | Chen et al. | 375/322 |
| 2007/0116144 | A1 * | 5/2007 | Wang et al. | 375/295 |
| 2007/0147547 | A1 * | 6/2007 | Chen et al. | 375/332 |
| 2008/0181326 | A1 * | 7/2008 | Krueger et al. | 375/261 |
| 2013/0039442 | A1 * | 2/2013 | Smallcomb et al. | 375/308 |
| 2013/0201895 | A1 * | 8/2013 | Smallcomb et al. | 370/312 |

* cited by examiner

*Primary Examiner* — Juan A Torres

(57) ABSTRACT

A low level secondary communication signal is summed with an existing primary communication signal in a manner that prevents interference to the existing primary communication signal while providing secondary communication signal benefits such as increased data rate, range, or interference immunity. Examples are presented in which a M-QAM secondary signal is summed with either an ATC Mode S PPM reply or DPSK interrogation primary signal. Legacy Mode S transponders, TCAS, and ADS-B equipment continue to demodulate and decode the primary signal information in accordance with preexisting formats while new enhanced equipment obtains the benefits of the secondary signal.

14 Claims, 15 Drawing Sheets

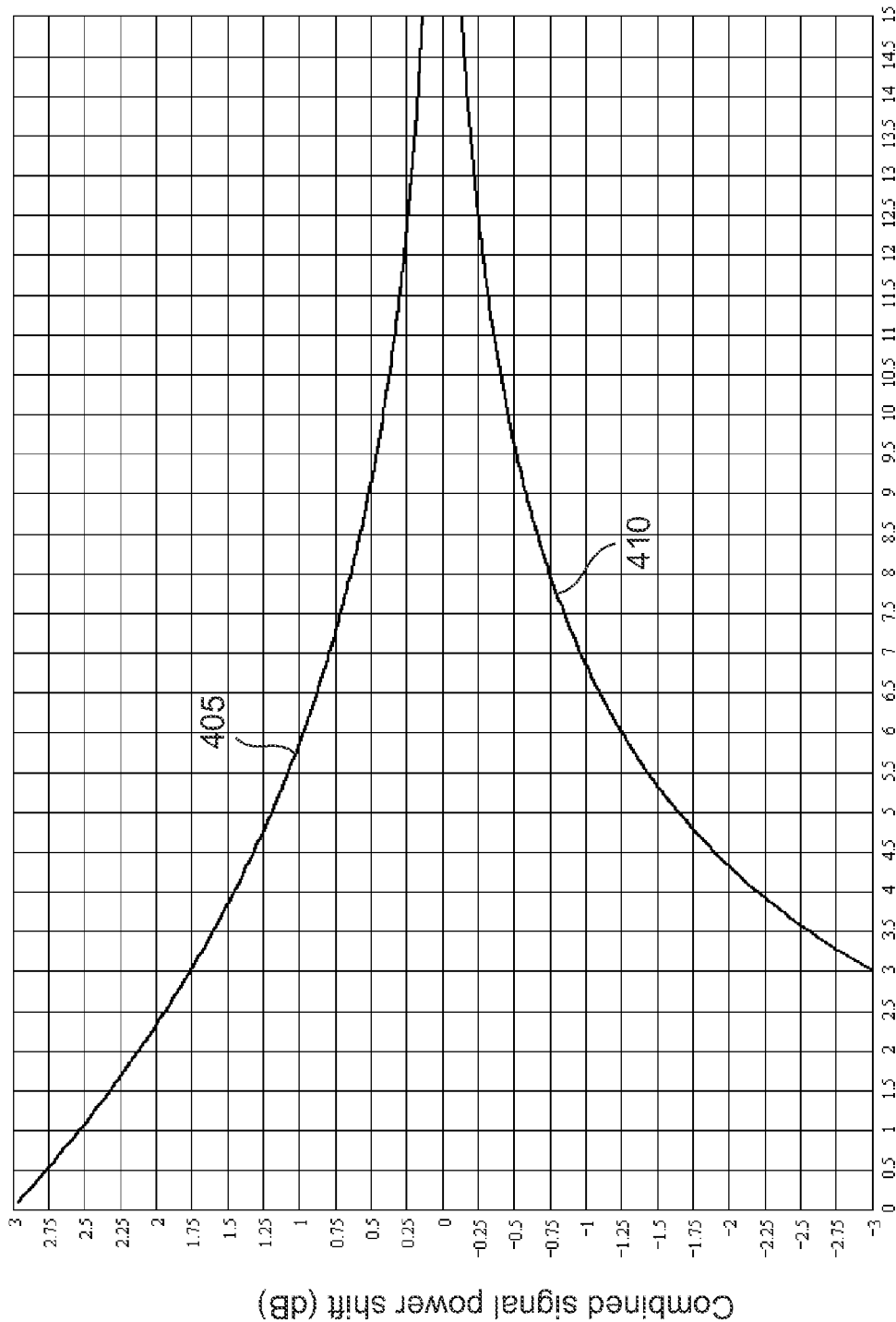

SECONDARY COMMUNICATION SIGNAL METHOD AND APPARATUS

TECHNICAL FIELD OF THE INVENTION

The present invention relates to the field of communications. More specifically, the present invention relates to summing a low level secondary communication signal to an existing primary communication signal in a manner that prevents interference to the existing primary communication signal while providing an overall communications benefit such as increased data rate, range, or interference immunity. In particular, this invention is applied to air traffic control (ATC) related communications.

BACKGROUND OF THE INVENTION

Most communication systems in widespread use today evolved from standards and equipment developed many years ago. This is especially true in the field of aircraft communications where equipment fielded one or two decades ago is still in use. Although these systems could be greatly enhanced using today's advances in communication technology, the cost of simply replacing them would be exorbitant due to the large quantity of this legacy equipment still in use.

However, newly manufactured equipment can be enhanced using advances in communication technology if these enhancements can be implemented in a manner that does not degrade the operation of current legacy equipment. It is acceptable that legacy equipment not be able to use or benefit from these enhancements as long as the enhancements do not degrade the performance of the legacy equipment.

One such ATC legacy system is the Mode S transponder whose reply data format is implemented using pulse position modulation (PPM). PPM is a modulation technique in which each bit interval is divided into two sub-intervals. A pulse is transmitted in one of the sub-intervals but not in both. Transmitting the pulse in the first sub-interval represents a "1" bit and represents a "0" bit when transmitted in the second sub-interval.

PPM was initially chosen because it is very simple to both modulate and demodulate. It is a non-coherent modulation technique which ignores the phase of the modulation pulse. An opportunity therefore exists to enhance new Mode S equipment by phase modulating the PPM pulses.

Such a PPM pulse phase modulation technique is described in U.S. Pat. No. 8,031,105 "Systems and Methods for Enhanced ATC Overlay Modulation". This patent describes an empirical based approach of using a second modulator, following the current PPM modulator, to phase modulate individual amplitude modulated output pulses of the first modulator with phase information.

Although this technique enhances the current Mode S transponder reply signal by converting the existing amplitude modulated pulses to Phase Shift Keying (PSK) modulated pulses, the technique is limited by the Mode S spectrum and pulse shape requirements. Careful adherence to pulse rise times and PSK modulation rate must be maintained to avoid violating Mode S signal specifications. Many of these phase modulation tradeoffs require empirical simulation and testing to ensure compliance which limits the benefits obtainable using this PPM remodulation technique.

Accordingly, it is the object of the present invention to disclose methods and apparatus which provide new and improved techniques for enhancing legacy communication systems without interfering with installed legacy equipment.

SUMMARY OF THE INVENTION

Briefly, to achieve the desired object of the present invention, a low level communication signal (secondary signal) is summed to an existing unaltered communication signal (primary signal) in a manner that prevents interference to the primary signal while providing an overall communication benefit such as increased data rate, range, or interference immunity.

In particular, a low level M-ary Quadrature Amplitude Modulation (M-QAM) secondary signal is summed with an ATC existing unaltered primary signal at a power level, frequency spectrum, phase, and time period chosen to prevent any interference to the primary signal by the secondary signal.

In the preferred implementation, the secondary signal is incorporated into new enhanced ATC communication equipment.

However, the secondary signal could also be implemented in completely separate external hardware suitably interfaced to new enhanced ATC communication equipment if desired.

Other objects and advantages of the present invention will become obvious as the preferred embodiments are described and discussed below.

BRIEF DESCRIPTION OF THE DRAWINGS

FIG. 8 illustrates the combined signal power shift when the primary and secondary signals are summed.

DETAILED DESCRIPTION OF THE PREFERRED EMBODIMENTS

Mode S transponder PPM replies on 1090 MHz are defined in RTCA/DO-181C specification "Minimum Operational Performance Standards for Air Traffic Control Radar Beacon System/Mode Select (ATCRBS/Mode S) Airborne Equipment" which is incorporated by reference herein in its entirety.

Figure 1:
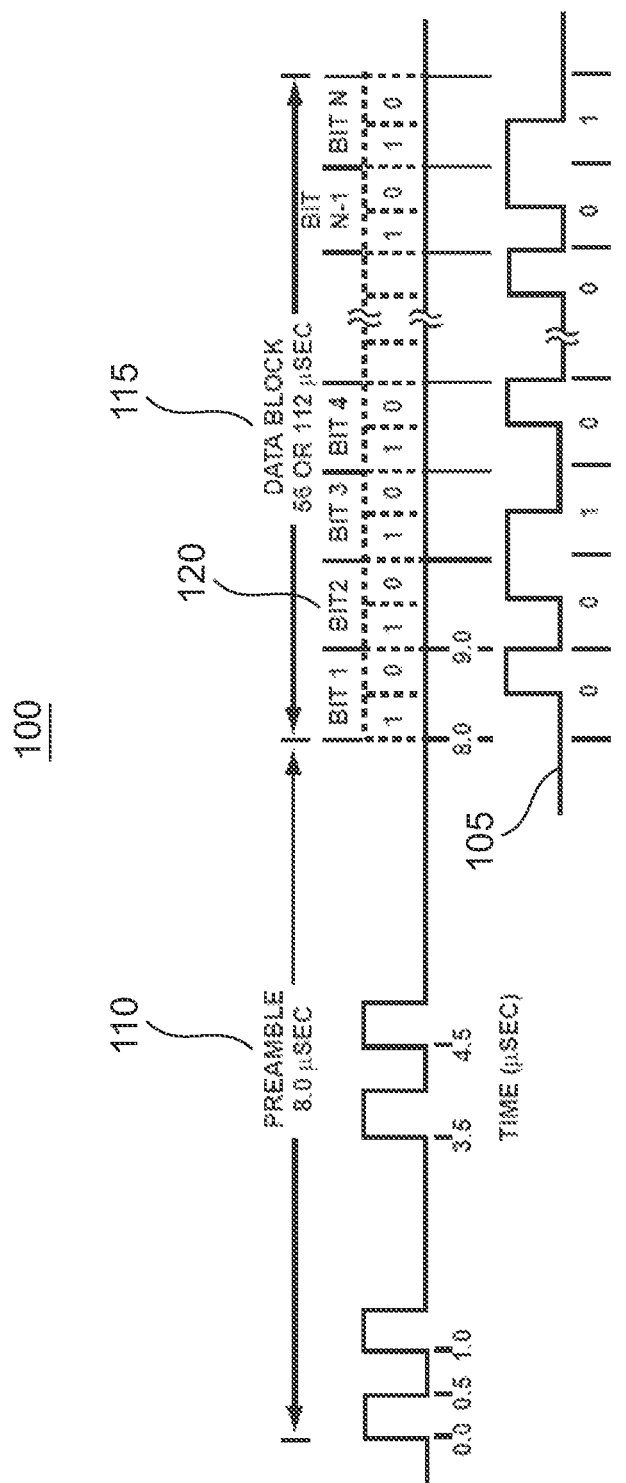
FIG. 1 illustrates a standard prior art 1090 MHz Mode S PPM reply waveform.
Figure 2:
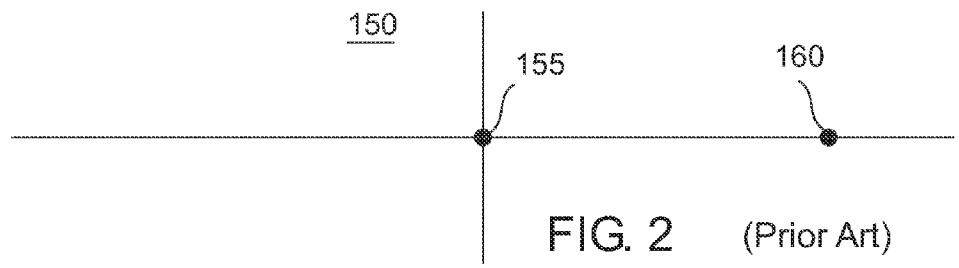
FIG. 2 shows a constellation diagram for the Mode S reply PPM waveform of FIG. 1.

A Mode S reply waveform 100 corresponding to bit sequence (0010 ... 001) 105 from this specification is illustrated in FIG. 1. This waveform consists of a preamble 110 followed by data block 115 which consists of either 56 or 112 PPM data bit intervals 120. A constellation diagram 150 is illustrated in FIG. 2 for this modulation signal. Constellation point 155 at zero amplitude and phase indicates no pulse is transmitted while constellation point 160 indicates an amplitude modulated pulse at zero phase is transmitted during preamble period 110 or data block period 115.

Figure 3:
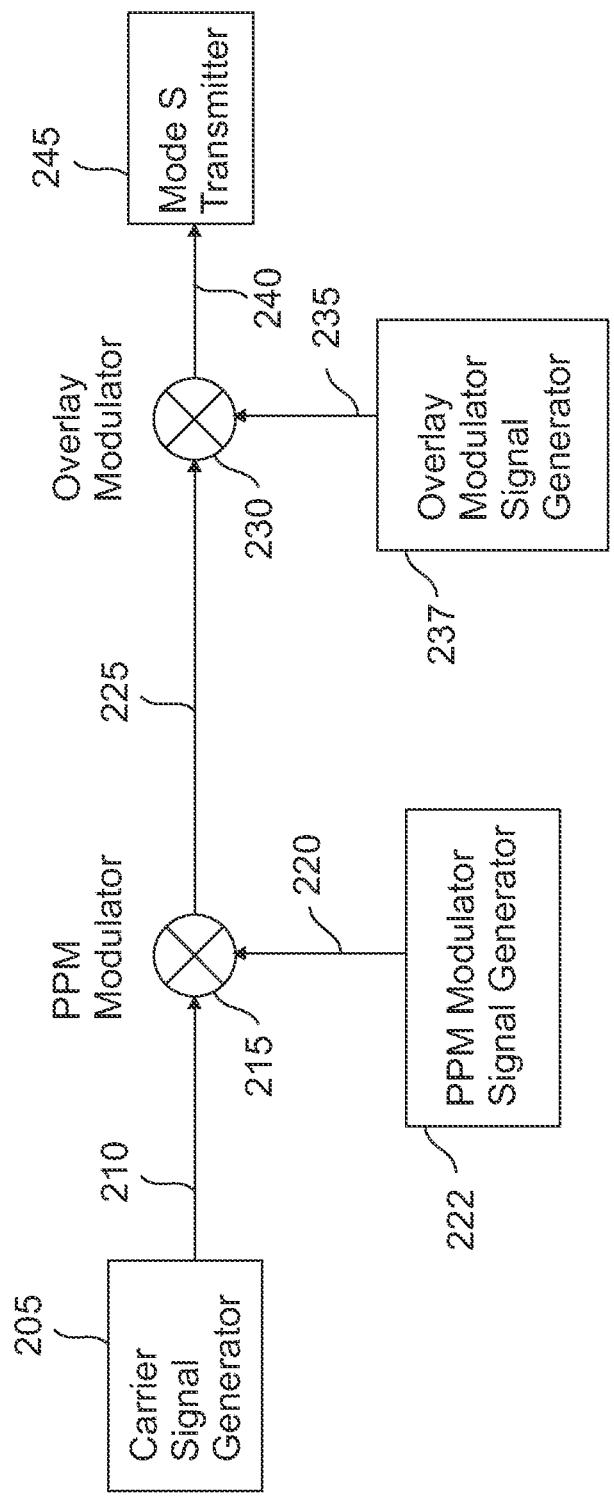
FIG. 3 shows a block diagram of a prior art overlay modulation technique.

A block diagram of a prior art enhancement technique using overlay modulation, which was described in U.S. Pat. No. 8,031,105, is illustrated in FIG. 3. Carrier signal generator 205 creates unmodulated carrier 210 which is PPM modulated in PPM modulator 215 by PPM modulator signal 220 from PPM modulator signal generator 222 to produce PPM modulated signal 225 that complies with existing standards. PPM Modulated signal 225 which has previously been modulated is then further modulated in overlay modulator 230 by overlay modulation signal 235 from overlay modulator signal generator 237 to produce modulated ATC stream 240 that provides a reply/squitter signal that is compatible with existing hardware yet contains information in excess of that defined by current transponder standards. ATC stream 240 is transmitted using Mode S transmitter 245.

Figure 4:
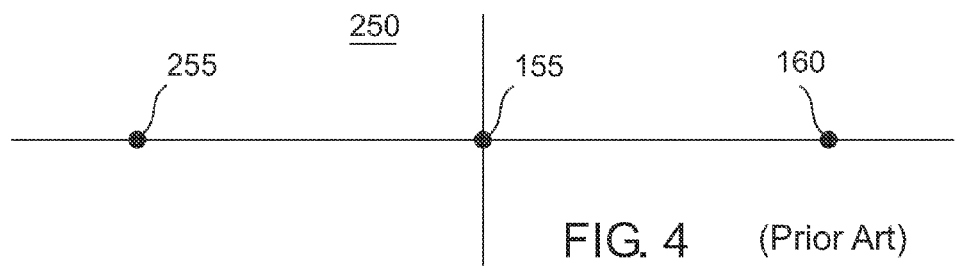
FIG. 4 shows a constellation diagram for a prior art overlay modulation technique.

A constellation diagram 250 of modulated ATC stream 240 is illustrated in FIG. 4. Constellation point 155 at zero amplitude and phase indicates no pulse was transmitted. Constellation points 160 and 255 indicate an amplitude modulated pulse at either zero phase or 180 degree phase respectively is transmitted during preamble period 110 or data block period 115 in FIG. 1 when overlay modulation signal 235 is PSK. That is, amplitude modulated PPM pulses 225 are converted to PSK pulses 240 by overlay modulation 235 as was illustrated in FIG. 3.

Figure 5:
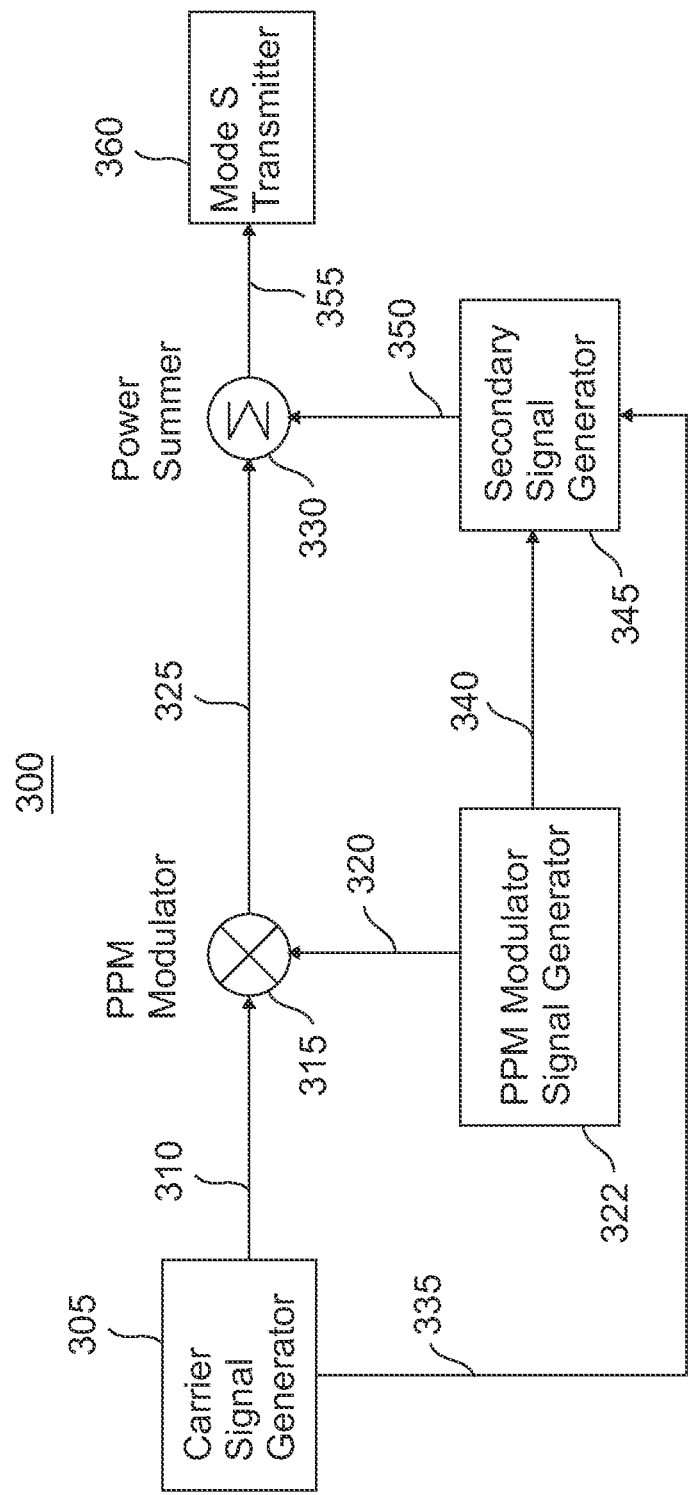
FIG. 5 shows a functional block diagram of a secondary signal generator applied to a Mode S transponder transmitter.

The current invention uses an enhancement method entirely different from this prior art enhancement method. A block diagram 300 of the current invention as applied to the same Mode S transmitter application (that was illustrated in FIG. 3) is illustrated in FIG. 5. Carrier signal generator 305 creates unmodulated carrier 310 which is PPM modulated in PPM modulator 315 by PPM modulator signal 320 from PPM modulator signal generator 322 to produce PPM modulated primary signal 325 that complies with existing standards.

Carrier reference signal 335 from carrier signal generator 305 is used by secondary signal generator 345 to create low level secondary signal 350. Power summer 330 combines primary signal 325 with secondary signal 350 to create combined signal 355 which is transmitted using Mode S transmitter 360. Reference signal 335 and timing signal 340 are used by secondary signal generator 345 to create secondary signal 350 at the proper frequency, phase, and timing.

Figure 6:
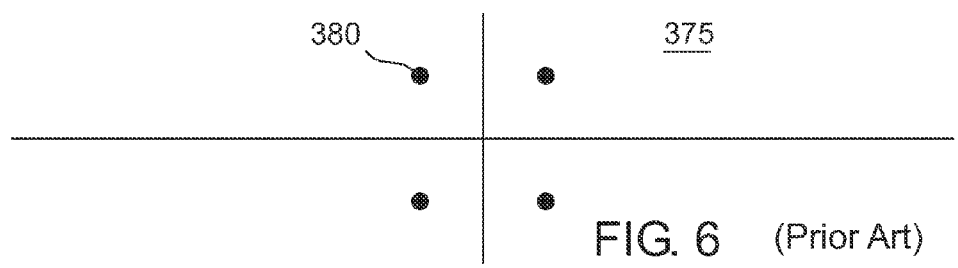
FIG. 6 shows a constellation diagram for 4-QAM.
Figure 7:
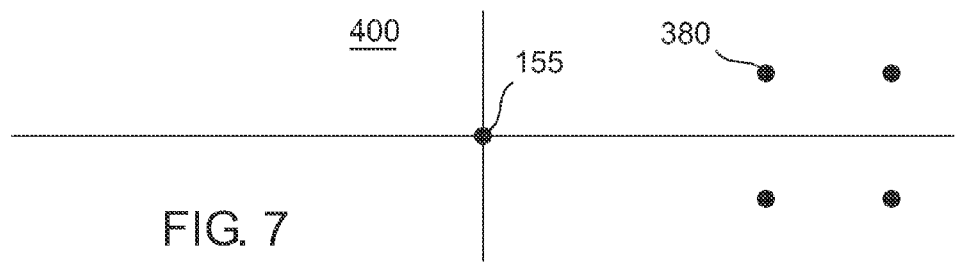
FIG. 7 shows the constellation diagram when a 4-QAM secondary signal is summed with a PPM primary signal.

A constellation diagram 375 of a standard 4-QAM (QPSK) secondary signal with amplitude-phase points 380 is illustrated in FIG. 6. When this secondary signal 350 is summed with standard PPM signal 325 whose constellation was illustrated in FIG. 2, constellation diagram 400 illustrated in FIG. 7 is created. Constellation points 380 indicate the vector sums of constellation point 160 in FIG. 2 with constellation points 380 in FIG. 6. Note that this summation simply transfers the center of the secondary signal 350 constellation illustrated in FIG. 6 to the primary signal 325 amplitude indicated by constellation point 160 in FIG. 2.

The primary benefits of the current invention are that any M-QAM or other modulation can be used for secondary signal 350 and many commercially available standard M-QAM modulation and demodulation integrated circuits can potentially be used if desired. Also, the spectrum and performance of M-QAM modulations are well known by those skilled in the art. Since signal summation is a linear process, the existing Mode S PPM signal spectrum and the secondary signal spectrum simply combine without generating any new signal components as occurs with modulators. Compliance with legacy specifications is straight forward by simply lowering the amplitude of secondary signal 350 as needed to meet spectrum and other specification requirements.

Figure 9:
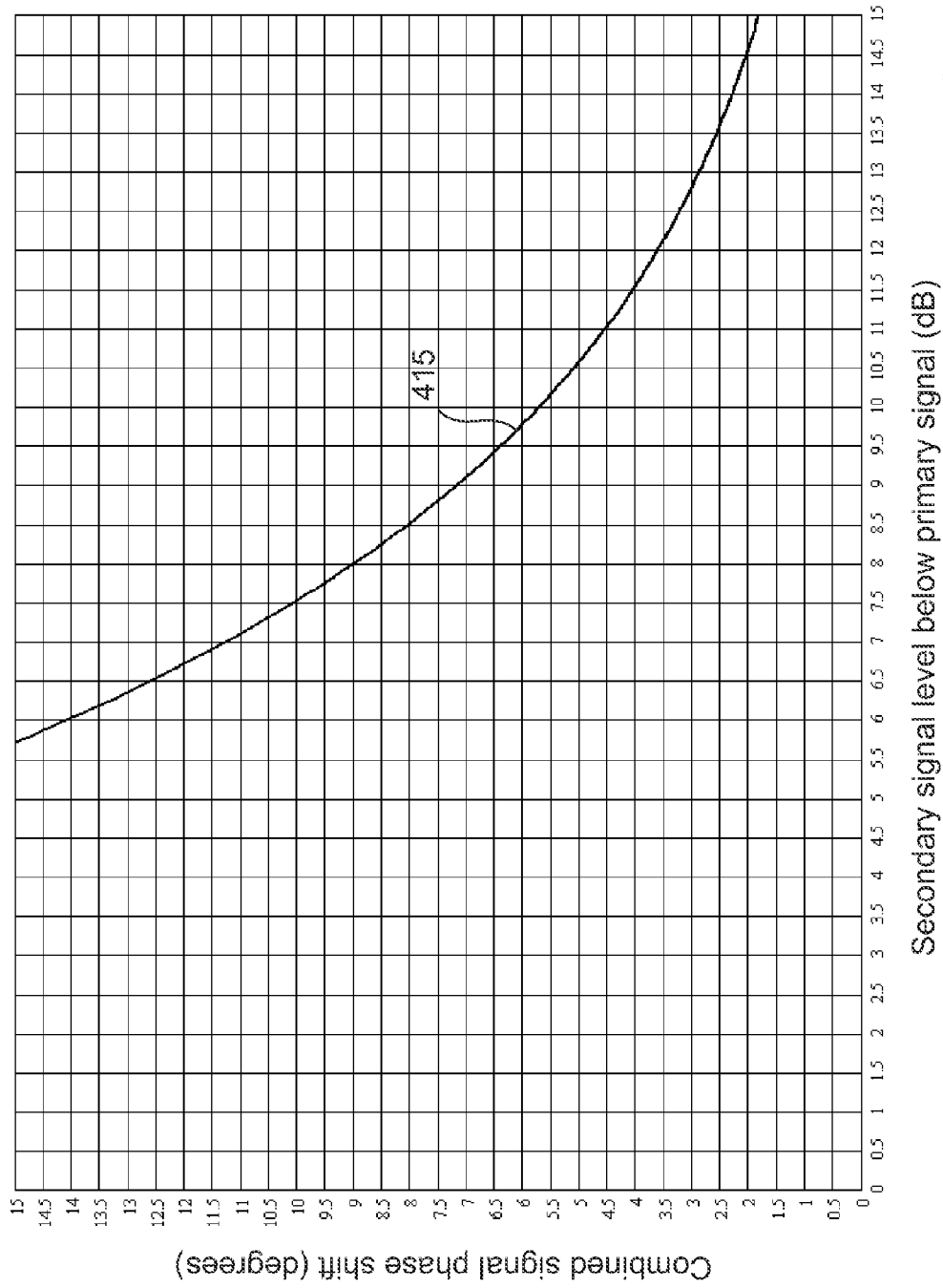
FIG. 9 illustrates the combined signal phase shift when the primary and secondary signals are summed.

Summing a low level M-QAM secondary signal with a Mode S PPM pulse primary signal alters the amplitude and phase of the PPM pulses. FIG. 8 and FIG. 9 illustrate the magnitude of the amplitude and phase variations respectively of a primary signal versus the power level of a summed secondary signal.

In FIG. 8, curves 405 and 410 indicate the increase and decrease of combined signal 355 (in dB along the y-axis) when an in-phase and out-of-phase respectively secondary signal 350 (whose power level in dB below primary signal 325 is indicated along the x-axis) is summed with primary signal 325.

In FIG. 9, curve 415 indicates the phase shift of combined signal 355 (in degrees along the y-axis) when a quadrature secondary signal 350 (whose power level in dB below primary signal 325 is indicated along the x-axis) is summed with primary signal 325.

The Mode S spec indicates that the PPM pulse amplitude variation over the duration of the message be no greater than 2 dB. As a M-QAM secondary signal 350 constellation point may either be in-phase or out-of-phase with primary signal 325, FIG. 8 indicates that secondary signal 350 must be at least 7 dB below primary signal 325 to meet the 2 dB specification.

M-QAM refers to m-ary Quadrature Amplitude Modulation where m equal 2 is Binary Phase Shift Keying (BPSK), m equal 4 is Quadrature Phase Shift Keying (QPSK), m equal 16 is 16-QAM, and m equal 64 is 64-QAM. If 4-QAM is used for secondary signal 350, a Signal-to-Noise ratio (SNR) of approximately 8 dB is required for a symbol error rate of $10^{-4}$. The probability of making at least 1 symbol error per a 112 symbol PPM message at this symbol error rate is 0.011 which indicates a loss of approximately 1 out of every one hundred 112-symbol messages. Mode S PPM data implements error detection but not error correction. A single symbol error causes a message error and the Mode S specifications require a 90 percent reception probability. Requiring a symbol error rate of $10^{-4}$ provides adequate implementation margin to ensure the 90 percent reception requirement is met.

In contrast, a SNR of approximately 16.5 dB is required for a legacy PPM non-coherent symbol error rate of $10^{-4}$. If Mode S used 4-QAM instead of non-coherent PPM, it would be 8.5 dB (16.5 dB–8 dB) more sensitive. Therefore, if 4-QAM secondary signal 350 at a power level 8.5 dB below legacy PPM primary signal 325 is summed with primary signal 325, the secondary signal 350 symbol and message error rate will be identical to legacy PPM primary signal 325 symbol and message error rate. However, secondary signal 350 carries 2 bits per symbol compared to 1 bit per symbol for legacy PPM primary signal 325 so the data rate of this 4-QAM secondary signal communications is twice that of the current legacy Mode S PPM primary signal communications.

Using 16-QAM requires a SNR of 13 dB for a symbol error rate of $10^{-4}$. Selecting 16-QAM for secondary signal 350 would increase the secondary signal communications rate to 4 times the Mode S PPM rate but its sensitivity would be 5 dB lower since 16-QAM requires 5 more dB (13 dB−8 dB) signal power than 4-QAM. Using 16-QAM is equivalent to decreasing received signal power by 5 dB when determining maximum range performance.

Figure 10:
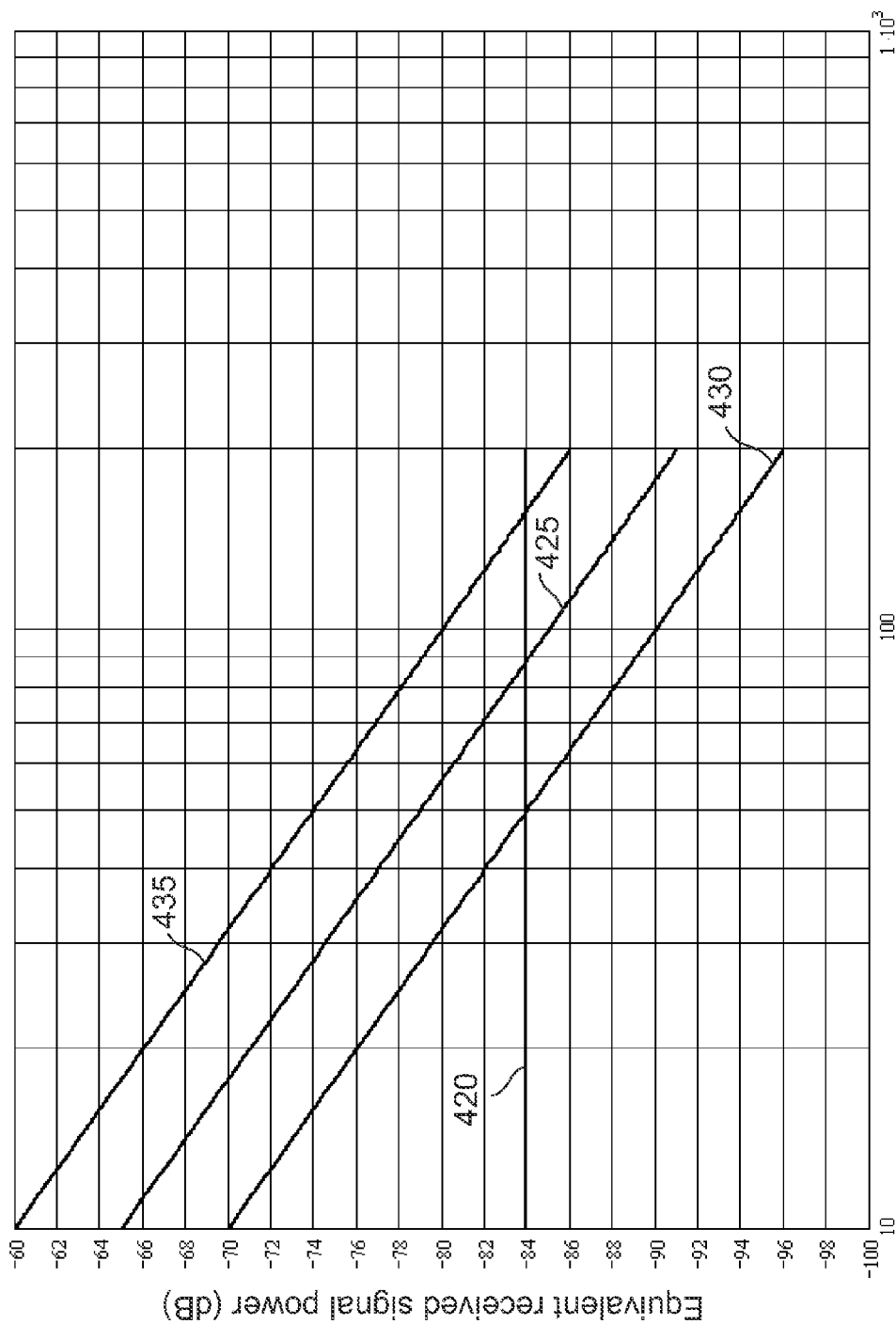
FIG. 10 illustrates the equivalent secondary signal received power versus range in NM for various secondary signal modulations.

FIG. 10 illustrates the range penalty due to increased or decreased sensitivity. The Mode S specifications are based on obtaining a 90 nautical mile (NM) reception range when the received signal power level is −84 dBm which is indicated by curve 420. That is, the required Mode S message error rate can be achieved when the received signal power level is −84 dBm or greater. As is well known, received signal level decreases with range at 6 dB per octave. Curve 425 assumes the Mode S equipment just meets the −84 dBm specification (y-axis) at 90 NM range (x-axis). Curve 430 illustrates range when received signal power is decreased by 5 dB which is equivalent to a 5 dB decrease in sensitivity. Note that maximum range (−84 dBm point) drops from 90 NM to 50 NM. Selecting 16-QAM for secondary signal 350 to obtain 4 times the Mode S PPM data rate may be a good tradeoff against shorter range if most high speed communications occur at ranges under 50 NM.

Although any M-QAM modulations can be selected for secondary signal 350, the pseudo-orthogonal QPSK signal encoders and decoders described in commonly owned U.S. Pat. No. 8,098,773 "Communication Method and Apparatus" and U.S. Pat. No. 8,437,431 "Sequential Decoder Fast Incorrect Path Elimination Method and Apparatus for Pseudo-Orthogonal Coding" are most attractive due to their superior error correcting abilities. U.S. Pat. Nos. 8,098,773 and 8,437,431 are incorporated herein by reference.

Figure 11B:
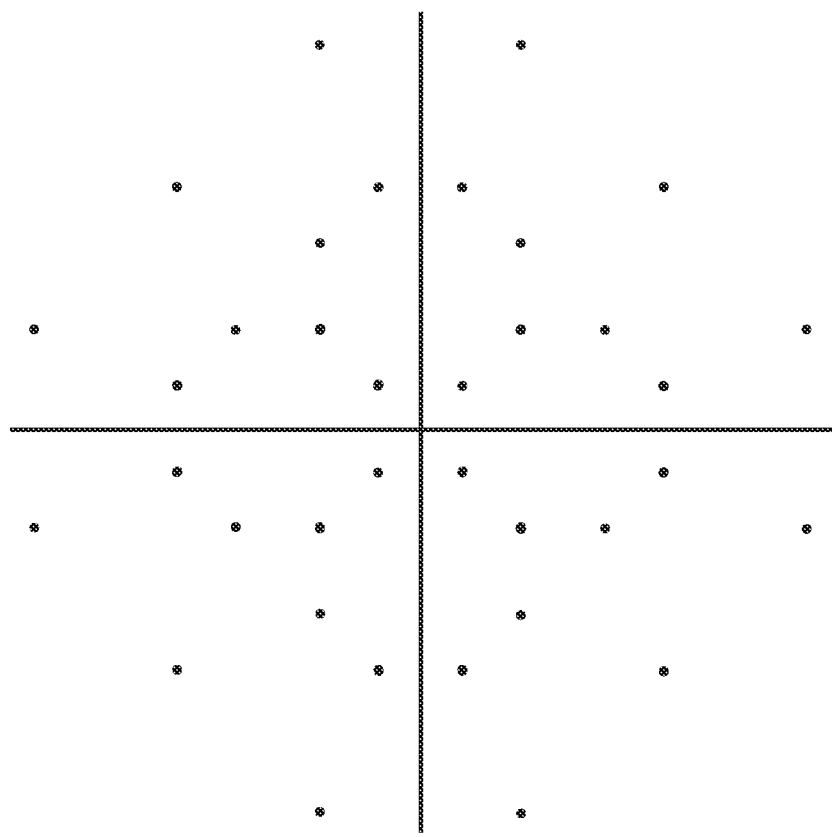
FIGS. 11a and 11b show versions of 16-QAM and 64-QAM phase point constellations respectively for M-QAM pseudo-orthogonal QPSK modulation.

As described in U.S. Pat. No. 8,098,773, two bits of message data are rate 1/2 Viterbi encoded into 16-QAM symbols using the constellation illustrated in FIG. 11a. Symbols are decoded using an efficient sequential decoding algorithm in which all paths through the decoding tree are retained until it is certain that a particular path cannot be the correct path. This rate ½ 16-QAM encoder/decoder provides 2 bits per symbol, does not require additional bandwidth, requires less SNR to achieve a given BER, and has far superior error correction ability with respect to any other short message coding techniques. The rate ½ Viterbi 64-QAM encoder/decoder described in U.S. Pat. No. 8,098,773 provides 3 bits per symbol. Its constellation, illustrated in FIG. 11b, contains 36 distinct phase point symbols but implements 64-QAM as explained in U.S. Pat. No. 8,098,773.

The decrease in BER with increased SNR is extremely steep for pseudo-orthogonal QPSK. Essentially error free performance in Additive White Gaussian Noise (AWGN) occurs at a SNR of 3 dB for 16-QAM and 6 dB for 64-QAM. Using the same analysis for 16-QAM pseudo-orthogonal QPSK as was used earlier for uncoded 4-QAM, an increase of 13.5 dB (16.5 dB−3 dB) is obtained at the same power level and an increase of 5 dB (13.5 dB−8.5 dB) when secondary signal 350 is 8.5 dB below primary signal 325. Using 16-QAM pseudo-orthogonal QPSK is equivalent to increasing received signal power by 5 dB. Since 64-QAM requires 3 dB more SNR than 16-QAM, using 64-QAM is equivalent to increasing received signal power by 2 dB.

Curve 435 in FIG. 10 illustrates range when received signal power is increased by 5 dB (which is equivalent to a 5 dB increase in sensitivity) by using 16-QAM pseudo-orthogonal QPSK. Note that maximum range (−84 dBm point) increases from 90 NM to 158 NM. Range is only slightly increased over legacy non-coherent PPM using 64-QAM pseudo-orthogonal QPSK. Note that this analysis is for equipment that just meets the minimum Mode S specifications of 90 NM reception range at −84 dBm. Mode S equipment typically exceeds this range. Exceeding this spec by 3 dB or 6 dB increases the 16-QAM pseudo-orthogonal QPSK range from 158 NM to 224 NM or 316 NM respectively.

Automatic Dependent Surveillance-Broadcast (ADS-B) squitters are periodic transmissions by Mode S transponders or stand-alone ADS-B equipment that are primarily used by aircraft to report various navigation, intent, and other data comprising the ADS-B information. Long range reception of ADS-B transmission is important for in-trail following communications where aircraft maintain separation from each other on over-water routes. A 16-QAM pseudo-orthogonal QPSK secondary signal provides 2 bits per symbol and could simply repeat the PPM primary signal data as part of its data package. In this way, in-trail communications could be maintained even though the aircraft are out of primary signal ADS-B communication range.

Figure 12:
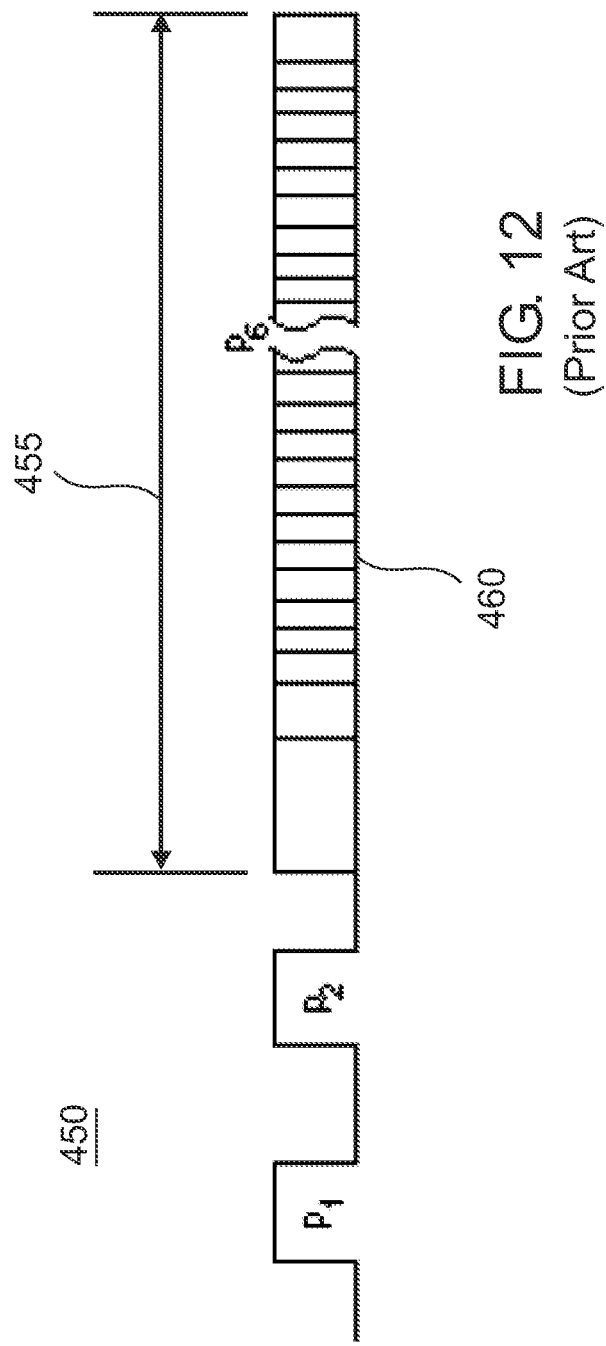
FIG. 12 illustrates a standard prior art 1030 MHz Mode S DPSK interrogation waveform.

A Mode S transponder interrogation signal on 1030 MHz is also defined in RTCA/DO-181C and its waveform 450 is illustrated in FIG. 12. This waveform consists of a number of pulses followed by data block 455 which consists of either 56 or 112 Differential Phase Shift Keying (DPSK) data bits. During each data bit chip 460 either an in-phase or out-of-phase signal is transmitted. A chip is an unmodulated interval preceded by possible phase reversals. If preceded by a phase reversal, a chip represents a "1" bit. If preceded by no phase reversal, a chip represents a "0" bit.

Figure 13:
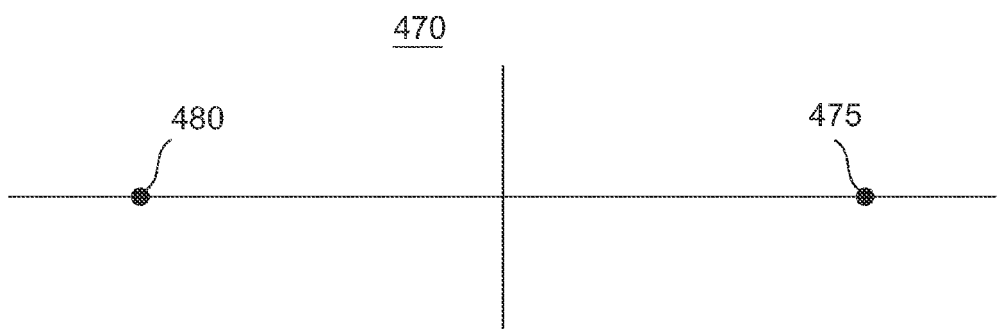
FIG. 13 shows a constellation diagram for the Mode S DPSK interrogation waveform.

A constellation diagram 470 is illustrated in FIG. 13 for this data block 455 DPSK modulation signal. Constellation point 475 indicates an in-phase (zero degrees) signal is transmitted while constellation point 480 indicates an out-of-phase (180 degrees) signal is transmitted.

Figure 14:
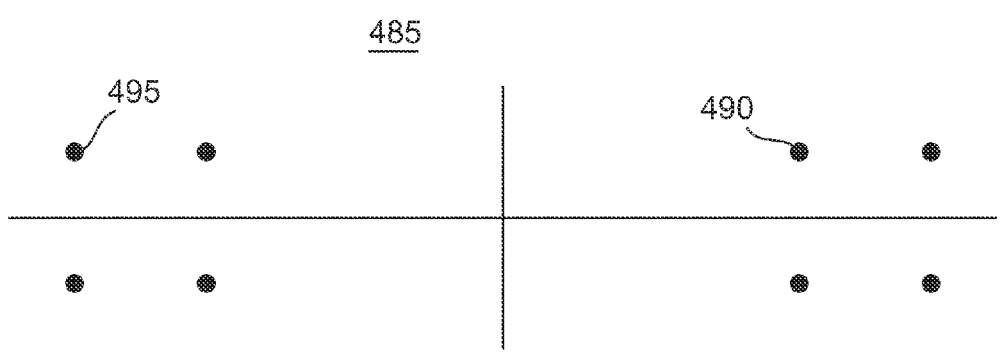
FIG. 14 shows the constellation diagram when a 4-QAM secondary signal is summed with a DPSK primary signal.

When constellation diagram 375 of standard 4-QAM secondary signal 350 with amplitude-phase points 380 in FIG. 6 is summed with DPSK primary signal 325 constellation 470 illustrated in FIG. 13, constellation diagram 485 illustrated in FIG. 14 is created. Constellation points 490 indicate the vector sum of constellation point 475 in FIG. 13 with constellation points 380 in FIG. 6 and constellation points 495 indicate the vector sum of constellation point 480 in FIG. 13 with constellation points 380 in FIG. 6. Note that this summation simply transfers the center of the secondary signal 350 constellation illustrated in FIG. 6 to the primary signal 325 amplitude and phase indicated by constellation points 475 and 480 in FIG. 13.

The Mode S spec indicates that the DPSK amplitude variation between successive phase modulation chips in data block 455 be less than 0.25 dB and the tolerance on the zero and 180 degree phase relationships be within plus and minus 5 degrees. To meet the amplitude requirement, FIG. 8 indicates secondary signal 350 amplitude must be at least 12.5 dB below primary signal amplitude 325. To meet the phase requirement, FIG. 9 indicates secondary signal 350 amplitude must be at least 10.5 dB below primary signal amplitude 325.

A SNR of approximately 9.5 dB is required for a legacy Mode S interrogation DPSK signal symbol error rate of $10^{-4}$. If 4-QAM is used for secondary signal 350, a SNR of approximately 8 dB is required for a symbol error of $10^{-4}$. If 4-QAM was used instead of DPSK, it would be 1.5 dB (9.5 dB–8 dB) more sensitive. Therefore, if 4-QAM secondary signal 350 at a power level 12.5 dB below legacy DPSK primary signal 325 is summed with primary signal 325, its sensitivity would decrease by 11 dB (12.5 dB–1.5 dB) indicating 4-QAM is not a good choice for secondary signal 350.

If 16-QAM pseudo-orthogonal QPSK, which can operate at a SNR of 2 dB for a symbol error of $10^{-4}$ with adequate hardware resources is used for secondary signal 350, it would have 6 dB (8 dB–2 dB) more sensitivity than using 4-QAM. This would reduce the decrease in sensitivity to 5 dB (11 dB–6 dB). Using 16-QAM pseudo-orthogonal QPSK is equivalent to decreasing received signal power by 5 dB as explained earlier. As illustrated by curve 430 in FIG. 10, the tradeoff for doubling the DPSK data rate (tripling the combined signal data rate) and reducing message error rate is a reduction in range.

Implementing secondary signal 350 in new Mode S transponders is fairly straight forward as is illustrated in FIG. 5. Carrier signal generator 305 must generate a stable coherent carrier signal with minimal phase shift over the duration of reply transmission 100 illustrated in FIG. 1. This is necessary so that secondary signal 350 can be demodulated at the receiver. In legacy Mode S equipment, the phase of each PPM pulse may be random.

In most modern communication equipment, PPM modulator signal generator 322 and secondary signal generator 345 are implemented in software. PPM modulator signal 320 and secondary signal 350 are created as baseband digital signals, digitally upconverted to a convenient intermediate frequency, and digital-to-analog converted prior to driving PPM modulator 315 and signal summer 330 respectively. As such, their relative power and phase relation can be precisely controlled. Combined signal 355 is then upconverted to 1090 MHz, amplified, and transmitted.

The generation of M-QAM signals is well known by those skilled in the art and VHDL cores for Field Programmable Gate Arrays (FPGA) are readily available. U.S. Pat. No. 8,098,773 describes the implementation of pseudo-orthogonal QPSK signal encoders in detail.

Figure 15:
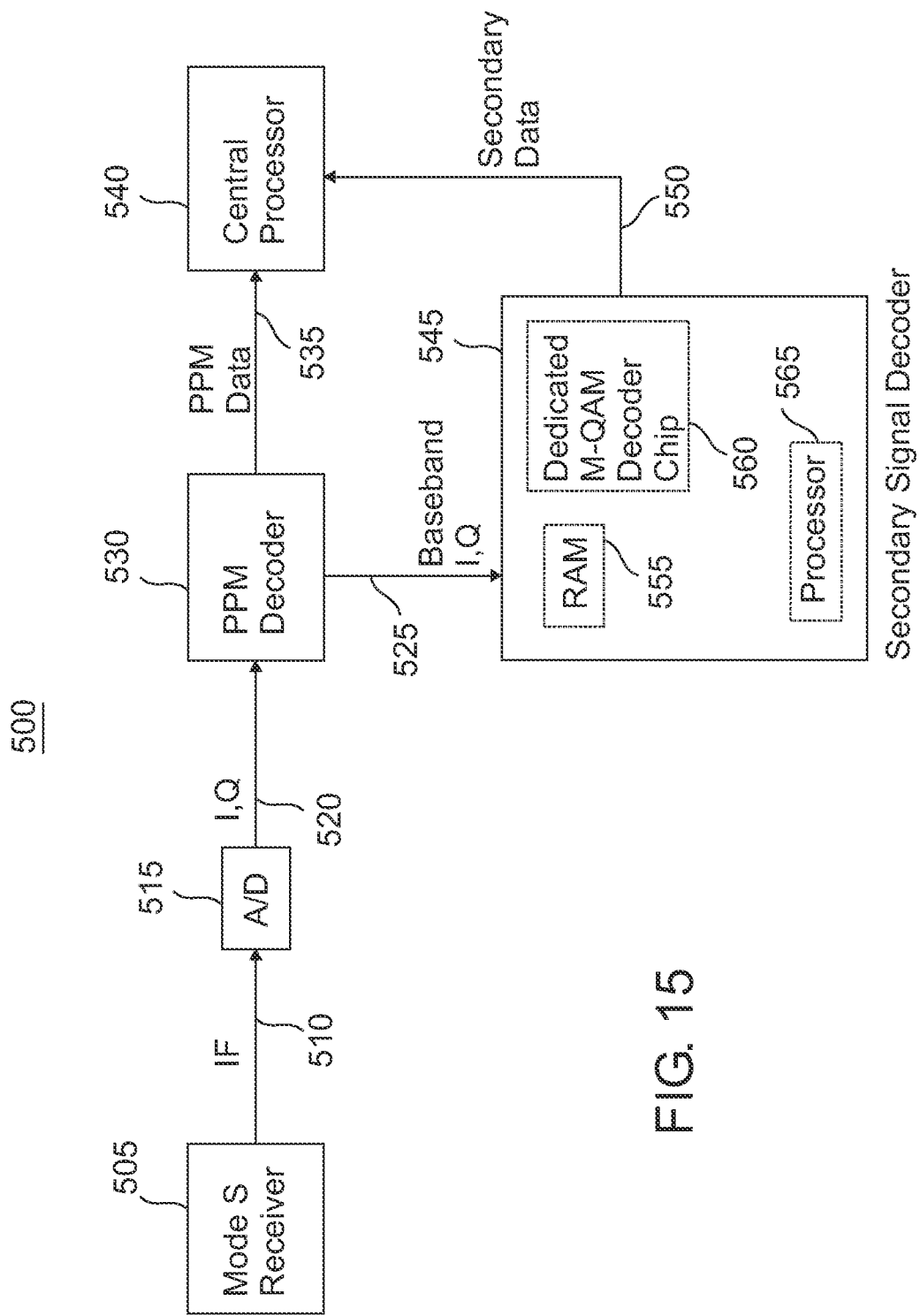
FIG. 15 shows a functional block diagram of a secondary signal decoder applied to a Mode S transponder receiver.

A functional block diagram 500 of a Mode S transponder receiver and secondary signal decoder is illustrated in FIG. 15. Mode S receiver 505 receives and downconverts the 1090 MHz combined signal to a convenient IF signal 510. In most modern communication equipment, IF signal 510 is Analog-to-Digital (A/D) converted using A/D converter 515 into In-Phase (I) and Quadrature-Phase (Q) digital signals 520. PPM decoder 530 digital filters, removes Doppler phase shift, down converts to baseband, and decodes the PPM primary signal data 535 which is sent to central processor 540. PPM decoder 530 also sends Doppler removed baseband I,Q digital data 525 to secondary signal decoder 545. Decoded secondary signal data 550 is sent to central processor 540.

Secondary signal decoder 545 in FIG. 15 may also contain Random Access Memory (RAM) 555 to temporarily store digitized Doppler removed baseband I,Q digital data 525 from PPM decoder 530 along with dedicated M-QAM decoder chip 560. This allows a much simpler processor 565 to be used to decode secondary signal messages than if the messages had to be processed in realtime. It also allows baseband I,Q digital data 525 to be processed multiple times to compensate or remove any residual Doppler phase shift. For example, an initial pass could remove any overall message rotation caused by Doppler shift prior to actually decoding the message.

The decoding of M-QAM signals is well known by those skilled in the art and VHDL cores for Field Programmable Gate Arrays (FPGA) are readily available. U.S. Pat. Nos. 8,098,773 and 8,437,431 describe the implementation of pseudo-orthogonal QPSK signal decoders in detail.

FIG. 5 and FIG. 15. illustrate enhancing an existing Mode S PPM reply communication system. However, the method can also be applied to many other existing communication systems. The methodology is to select and generate an appropriate secondary signal, sum it with the existing communication system primary signal to create a new combined signal, and transmit the new combined signal instead of the primary signal. The secondary signal must be selected so that the combined signal still conforms to the existing primary signal system specifications. When the combined signal is received, both the primary and secondary signal information is extracted.

The Mode S transponder PPM reply on 1090 MHz and the Mode S transponder interrogation signal on 1030 MHz both send data as either a 56 bit or 112 bit data packet. FIG. 5 and FIG. 15. illustrate enhancing the PPM reply primary signal (primary data packet) using a secondary data packet for the secondary signal in which both the primary and secondary data packets contain the same number of symbols and the symbols are aligned in time. This approach has the advantage that both the PPM primary signal and the M-QAM secondary signal have the same symbol rate so the same integrate and dump matched filter can be used to decode both signals. All downconversion, filtering, and Doppler removal resources can be placed in PPM decoder 530 in FIG. 15. Baseband I,Q samples 525 are already optimum filtered and processed so that function does not have to be repeated again in secondary signal decoder 545.

In contrast, prior art enhancement described in U.S. Pat. No. 8,031,105 and illustrated in FIG. 3 postulate using a higher rate overlay modulation then the existing PPM modulation rate whereby multiple phase transitions are encoded in one logical PPM bit sub-interval. This approach degrades sensitivity and Doppler removal because optimum match filtering over the entire PPM symbol period cannot be used when multiple random data bits occur over this period.

Figure 16:
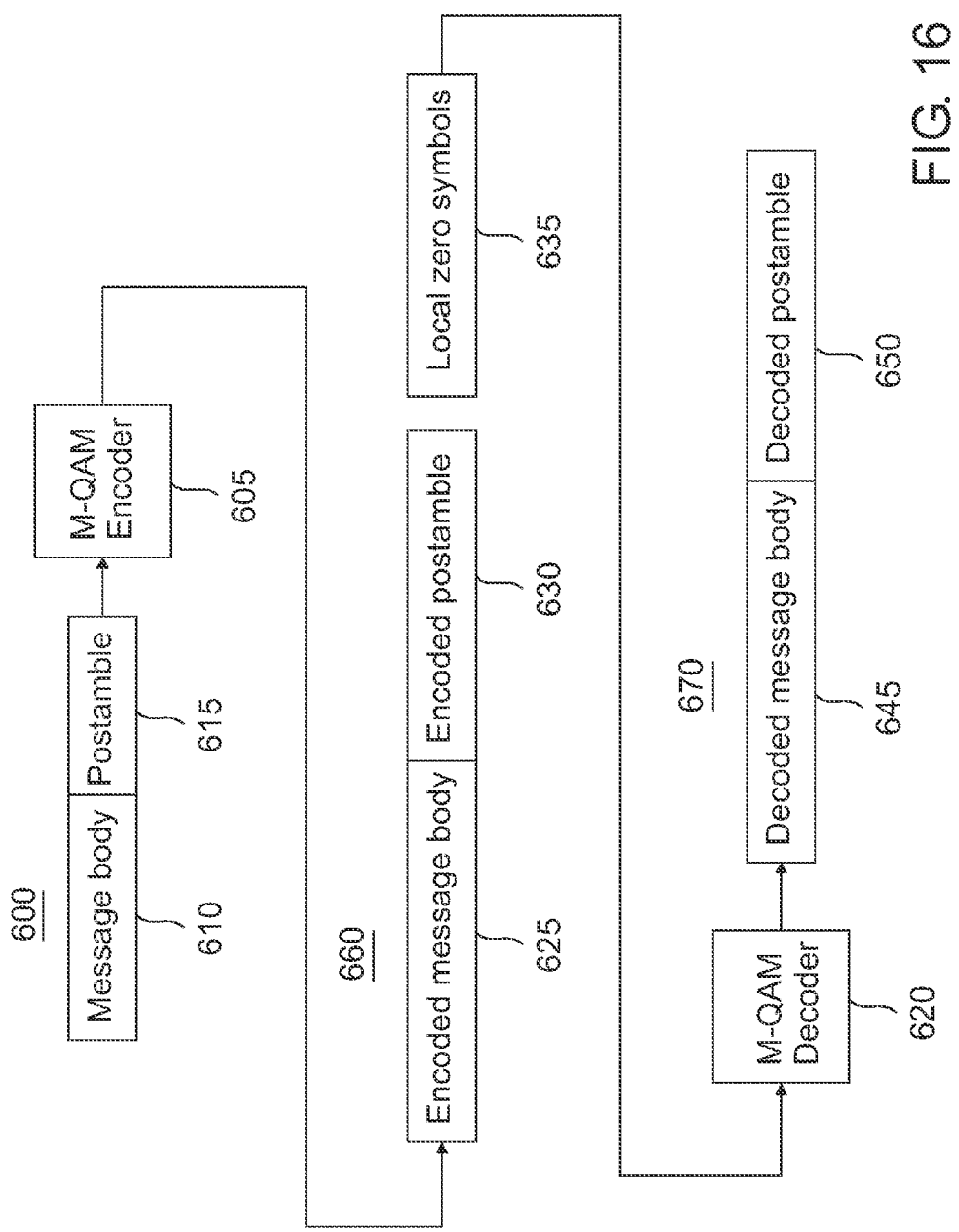
FIG. 16 shows a secondary signal message format prior to M-QAM encoding, after encoding (transmitted message packet), prior to decoding, and after decoding.

A beneficial original, encoded, and decoded message format when pseudo-orthogonal QPSK signal encoders and decoders are selected for secondary signal 350 is illustrated in FIG. 16. A fixed length message 600 is defined composed of a fixed length message body 610 and a short fixed length postamble 615.

The purpose of using a fixed message length 600 and postamble 615 is to end encoded message 660 in the encoder zero state. Postamble 615 contains a number of "zero" encoder input bits, the number related to the constraint length of the Viterbi encoder, which returns M-QAM pseudo-orthogonal QPSK signal encoder 605 to its zero state. Encoded message 660 is the actual transmitted data symbol packet and consists of encoded message body 625 and encoded postamble 630. The final symbols in encoded postamble 630 encoder output, are output symbols resulting from encoder postamble 615 input "zero" bits, obtained as the Viterbi encoder returns to its zero state.

The convolutional decoder described in U.S. Pat. No. 8,437,431 retains all paths through the decoding tree until it is certain a path is not the correct path. At the end of the message, in a noisy communication environment, the minimum metric path may not be the correct path.

When transmitted encoded message 660 (transmitted symbol packet) is received, a number of noiseless locally generated "zero symbols" 635 are appended to received encoded message 660 prior to decoding. Since appended "zero" symbols 635 are noiseless, they quickly eliminate all incorrect paths thus identifying the correct path in decoder 620 and thus the correct decoded message 670. The decoded postamble 650 of decoded message 670 will be discarded and the original transmitted message in decoded message body 645 will be sent to central processor 540.

M-QAM pseudo-orthogonal QPSK decodes the entire message as a packet as opposed to decoding each individual symbol. This is an important benefit in a high traffic environment because it allows many individual packet symbols to be jammed and lost yet not make a packet error. As long as the correct path is retained, no message error will occur. The message format illustrated in FIG. 16 ensures the correct path will be retained when symbol jamming occurs late in the message.

Figure 11A:
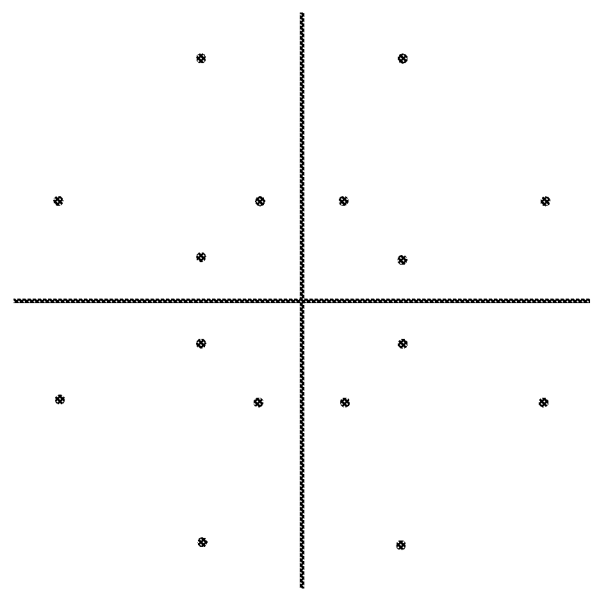
Figure 17:
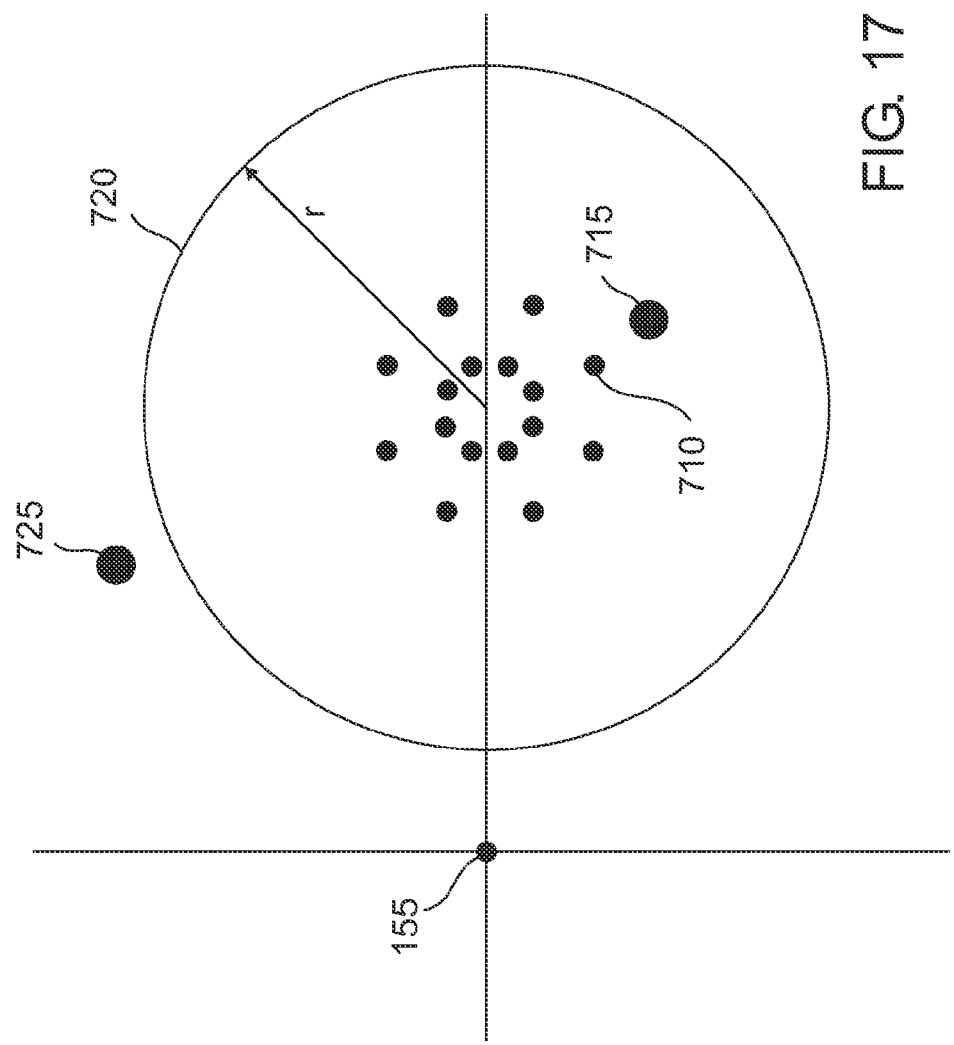
FIG. 17 shows an editing ring of radius "r" used to discard secondary signal received symbols that fall outside the editing ring.

Eliminating the effects of jamming on Mode S PPM replies when using 16-QAM pseudo-orthogonal QPSK is illustrated in FIG. 17 which replaces 4-QAM constellation points 380 in FIG. 7 with the 16-QAM constellation points illustrated in FIG. 11*a*.

Assume 16-QAM constellation symbol 710 in FIG. 17 was transmitted and point 715 was received due to noise when interference was not present. Point 715 will be meaningful processed in the decoder because it is close to an actual constellation point. However, if interference jamming moves transmitted point 710 to point 725, it is not meaningful to process point 725 in the decoder.

Obvious jammed symbols will be eliminated by modifying the decoder algorithm to in effect place an editing ring 720 of some radius "r" around the center of the constellation and not processing any symbols that fall outside the ring. Current paths in the decoder will be propagated as usual but their current residuals will not be changed. Since a jammed symbol adds no information to the decoding process, eliminating the symbol will not falsely affect the current state of the decoder. Radius "r" can either be fixed or adjusted based on current SNR. The editing ring 720 should be just outside the expected noise altered constellation points.

Figure 18:
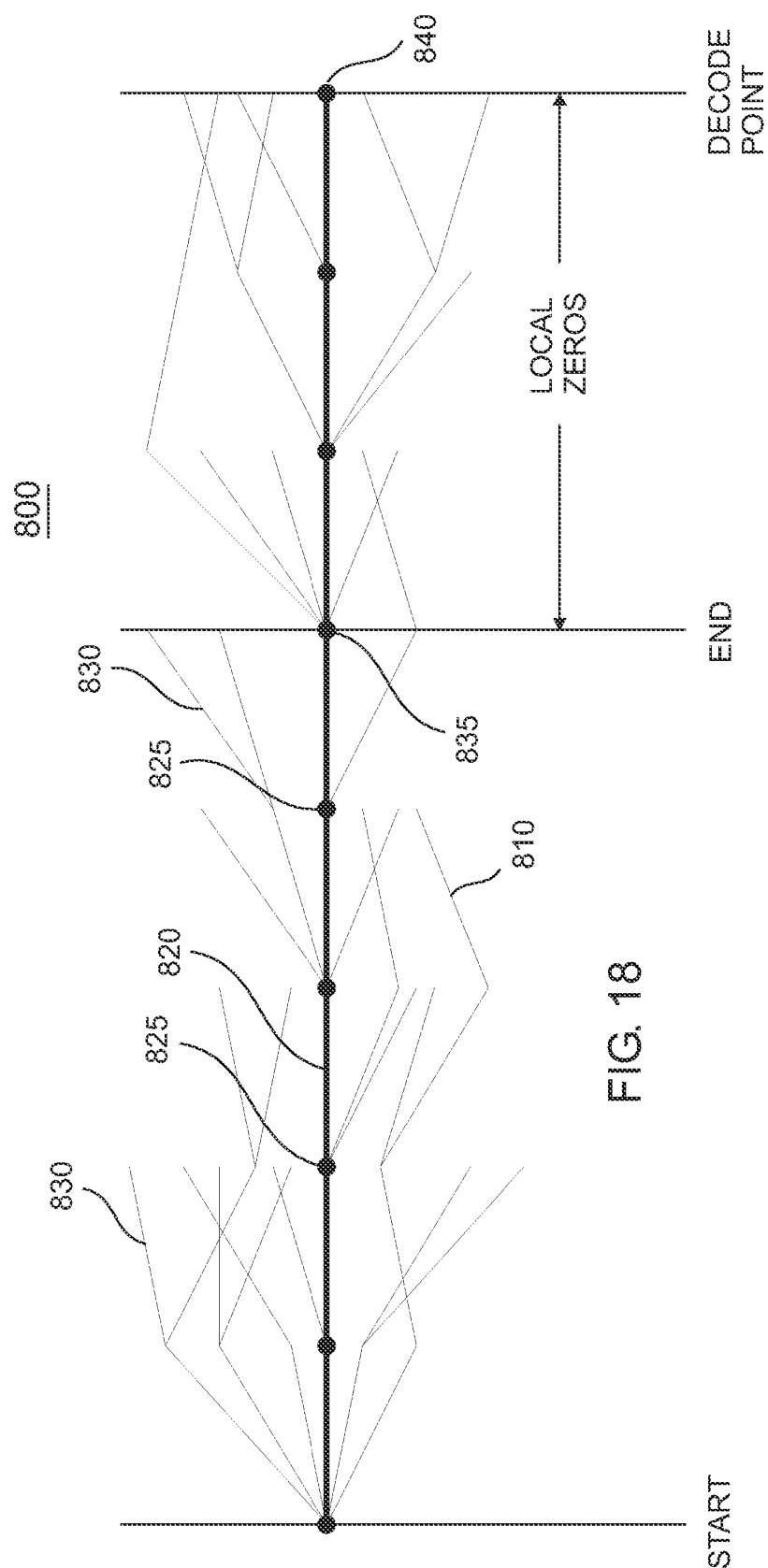
FIG. 18 illustrates the creation and termination of M-QAM pseudo-orthogonal QPSK modulation decoder paths.

Optimum M-QAM pseudo-orthogonal QPSK decoding in a noisy and high interference environment can be obtained by using editing ring 720 in FIG. 17, RAM 555 in FIG. 15, and message format 600 in FIG. 16 as illustrated by decoding path history 800 in FIG. 18. Points 825 indicate symbol times along the correct path 820. All other paths 830 are incorrect paths. As explained in U.S. Pat. Nos. 8,098,773 and 8,437, 431, at each symbol time, the residuals of all paths are updated and any existing path spawns new paths. A path exists until its accumulated residual exceeds a threshold, at which time the path is eliminated.

As residuals are accumulated, editing ring 720 does not allow the current residual of any path to be corrupted by a jammed symbol. Each current path generates multiple new paths at each symbol time 825. RAM 555 saves processing resources by allowing the decoder to serially decode a path until it is eliminated instead of requiring enough resources to decode all current paths in parallel. For example path 810 exists for 4 symbol times before it is eliminated. When a path is eliminated, its entire path history can be deleted allowing its processor and memory resources to be used to process another path.

Symbol 835 is the last transmitted symbol. Using message format 600 allows noiseless non-jammed locally generated zero symbols 635 to be entered into decoder 620 to flush out all remaining current paths except correct path 820. The correct path residual in decoder 620 does not change as zero symbols 635 are entered while the path residuals of all incorrect paths increase. Zero symbols 635 can be entered until only one path remains which will be correct path 820. FIG. 18 assumes this occurs at symbol 840 where all incorrect paths are eliminated except correct path 820.

Figure 19:
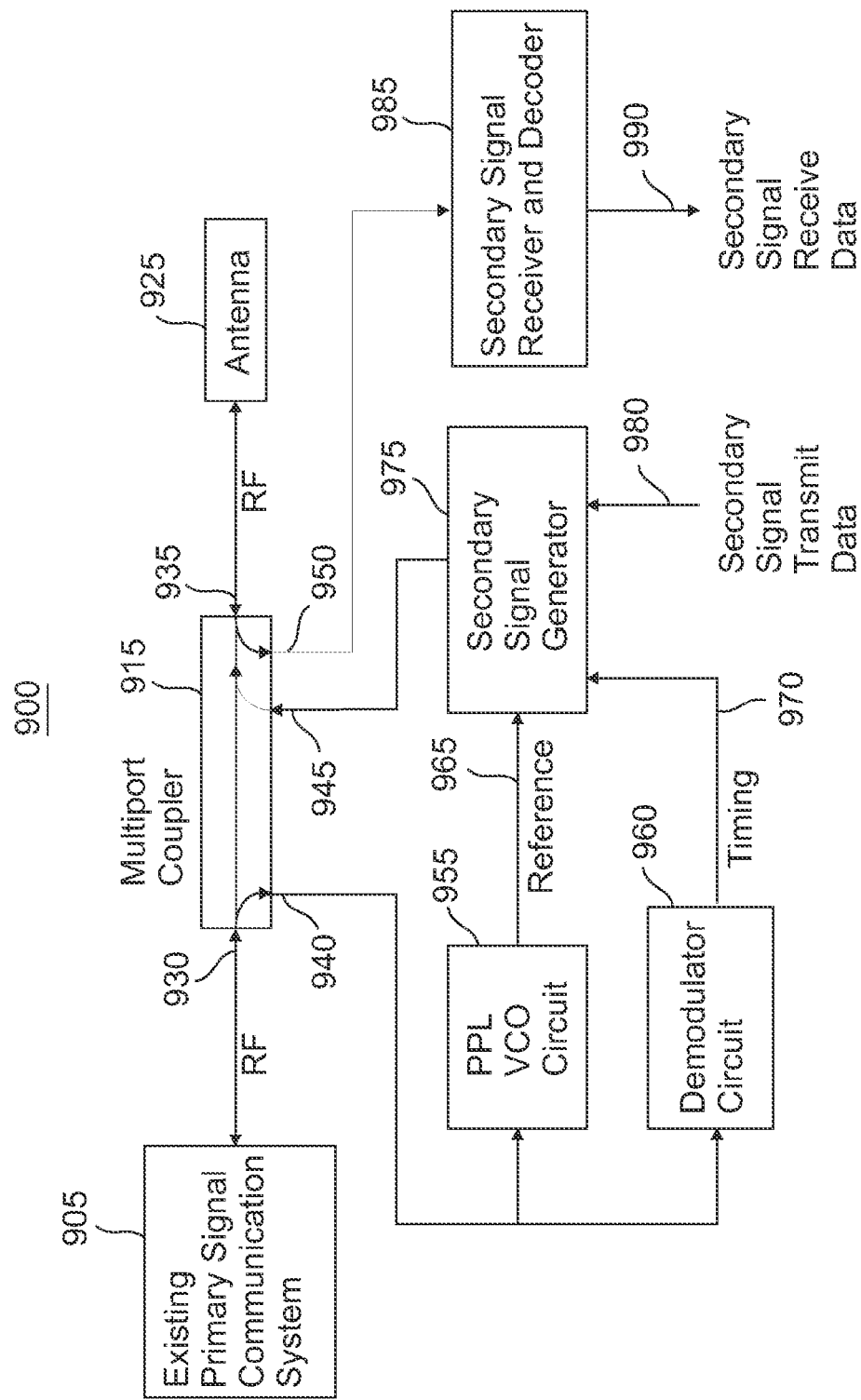
FIG. 19 shows a functional block diagram of the secondary communication signal implemented in external hardware.

For some enhanced communication applications, it may be desirable to implement the secondary communication signal completely separate from the existing communication system as illustrated by functional block diagram 900 in FIG. 19.

Normally, an existing primary signal communication system (transceiver) 905 is simply connected to antenna 925 through a RF antenna cable. To implement secondary communication, multiport coupler 915 is inserted between transceiver 905 and antenna 925. Transceiver 905 is connected to transmit port 930 and antenna 925 is connected to receive port 935. These ports implement a low loss multiport coupler 915 connection between transceiver 905 and antenna 925.

Phase lock loop (PLL) and voltage controlled oscillator (VCO) circuit 955 obtain a sample of transceiver 905 primary signal via transmit output coupling port 940 and generates a carrier reference signal 965 for secondary signal generator 975. Likewise, demodulator circuit 960 generates a timing signal 970. These signals are used to create a secondary signal constellation from transmit data 980 that is aligned in time and phase with transceiver 905 primary signal. Receive input coupling port 945 sums the primary and secondary signals to create a combined signal which is transmitted on antenna 925. A combined signal received on antenna 925 is coupled through receive output coupling port 950 to secondary signal receiver and decoder 985 to extract secondary signal data 990.

FIG. 19 further illustrates that this secondary communication signal invention does not modulate the existing primary communication signal. Instead, the primary and secondary communication signals are simply vector summed. For most applications the preferred implementation is to incorporate the secondary communication signal into an updated version of existing equipment. However, if that is not possible, this enhancement can be implemented completely external of existing equipment.

In summary, a key advantage of this secondary communication signal invention over prior art is its ability to implement standard communication signals, such as M-QAM modulation, which have well known performance and spectral characteristics. FPGA code for multiple versions of secondary signal M-QAM modulations could be implemented, stored in FPGA configuration memory, and loaded into FPGA hardware for different communication scenarios. For example, 16-QAM pseudo-orthogonal QPSK could be loaded for long range in-trail communication when over oceans and uncoded 16-QAM or even 64-QAM could be loaded for short range high data rate communications.

For data exchange between specific addressed users, the equipment could automatically negotiate with each other to select the highest data transfer rate as do typical modems. Since M-QAM spectrums are primarily a function of symbol rate, higher data rates can be selected simply by loading higher order M-QAM modulation types (higher M number). Transmitting, receiving, downconverting, and match filtering functions would not change since the symbol rate does not change as M-QAM modulation order increases.

Although the examples presented herein were for ATC Mode S transponder applications, this invention is applicable for numerous other applications in which adding a secondary communication signal to a legacy primary signal provides a benefit. Many simple modifications to the described system are possible without departing from the spirit of the invention.

The invention claimed is:

1. A method for enhancing an existing communication system, said method comprising:
   summing a M-QAM pseudo-orthogonal QPSK secondary signal to a primary signal to create a combined signal, said primary signal being said existing communication system signal, said combined signal being the vector sum of said primary signal and said secondary signal;
   selecting said secondary signal so said combined signal conforms to said primary signal existing specifications, wherein said selecting includes selecting modulation type, power level, frequency spectrum, phase, and timing;
   transmitting said combined signal instead of said primary signal;
   receiving said combined signal;
   converting received said combined signal to I,Q digital samples;
   extracting said primary signal information from said I,Q digital samples; and
   extracting said secondary signal information from said, I,Q digital samples, wherein said extracting said secondary signal information comprises:
      downconverting said I,Q digital samples to baseband I,Q digital samples; and
      discarding said baseband I,Q samples whose amplitude or phase exceed an edit threshold value, said threshold value based on said secondary signal constellation points and current SNR.

2. A method as claimed in claim 1 wherein said modulation type is 16-QAM pseudo-orthogonal QPSK.

3. A method as claimed in claim 1 wherein said modulation type is 64-QAM pseudo-orthogonal QPSK.

4. A method as claimed in claim 1 wherein said power level is at least 7 dB lower than said primary signal power level and said timing is only during said primary signal transmissions when said primary signal is the standard ATC 1090 MHz Mode S PPM reply waveform.

5. A method as claimed in claim 1 wherein said power level is at least 12.5 dB lower than said primary signal power level and said timing is only during said primary signal transmissions when said primary signal is the standard ATC 1030 MHz Mode S DPSK interrogation waveform.

6. A method as claimed in claim 1 wherein said method further comprises generating said primary signal and said secondary signal frequency and phase locked to signals derived from the same carrier signal generator whose 1 second frequency stability is at least $1 \times 10^{-6}$.

7. A method as claimed in claim 1 wherein said extracting said secondary signal information comprises:
   storing said baseband I,Q digital samples in RAM;
   repeatedly retrieving, processing, and decoding said baseband I,Q samples in RAM to iteratively remove any Doppler or implementation phase shift; and
   decoding said secondary signal information in dedicated M-QAM decoder chip.

8. A method as claimed in claim 1 wherein said primary signal implements a primary data symbol packet, said secondary signal implements a secondary data symbol packet containing the same number of data symbols as said primary data symbol packet, and symbols in said secondary data symbol packet are aligned in time with symbols in said primary data symbol packet.

9. A method as claimed in claim 8 wherein said encoder input message consists of a fixed length message body and fixed length postamble, said postamble containing said encoder zero bits used to return said encoder to its zero state.

10. A method as claimed in claim 8 wherein said decoder input message consists of an encoded fixed length message body, encoded fixed length postamble, and noiseless locally generated zero symbols, said zero symbols used to eliminate all incorrect tree decoding paths in said decoder thus identifying the correct said decoder path and correct decoded message.

11. An apparatus for enhancing an existing communication system, said system comprising:
   a multiport coupler with a transmit port, receive port, transmit output coupling port, receive input coupling port, and receive output coupling port;
   an existing communication system coupled to said transmit port of said multiport coupler and configured to transmit and receive a primary signal;
   a said existing communication system antenna coupled to said receive port of said multiport coupler and configured to transmit and receive said primary signal;
   a PPL VCO circuit coupled to said transmit output coupling port of said multiport coupler and configured to generate a reference carrier signal, said carrier signal frequency and phase locked to said primary signal;
   a demodulator circuit coupled to said transmit output coupling port of said multiport coupler and configured to generate a timing signal, said timing signal time locked to said primary signal modulation;
   a signal generator coupled to said receive input coupling port of said multiport coupler, said carrier signal, said timing signal, a source of digital transmit data, and configured to generate and transmit a secondary signal, wherein said secondary signal sums with said primary signal in said multiport coupler to form a combined signal, and wherein said secondary signal is selected so said combined signal conforms to said primary signal existing specifications; and
   a secondary signal receiver and decoder coupled to said receive output coupling port of said multiport coupler and configured to receive and decode said secondary signal data from said antenna.

12. A method for increasing the data throughput, range, interference immunity, and message reception probability of ATC Mode S and ADS-B PPM reply and squitter data communications while remaining compatible with legacy signal specifications, said method comprising:
   formatting a M-QAM pseudo-orthogonal QPSK secondary signal message as a fixed length message body and fixed length postamble, said postamble containing said M-QAM pseudo-orthogonal QPSK encoder zero bits used to return said encoder to its zero state;
   encoding said secondary signal message into said M-QAM pseudo-orthogonal QPSK data packet symbols;
   summing said M-QAM pseudo-orthogonal QPSK secondary signal to a primary signal to create a combined signal, said primary signal being said PPM reply and squitter signal, said combined signal being the vector sum of said primary signal and said secondary signal;
   selecting power level, frequency spectrum, phase, and timing of said secondary signal so said combined signal meets said primary signal said legacy signal specifications;
   transmitting said combined signal instead of said primary signal;
   receiving said combined signal;
   extracting said primary signal information from said combined signal;

extracting said secondary signal information from said combined signal;

editing received said data packet symbols to remove said symbols that exceed a threshold;

appending locally generated zero symbols to said edited data packet symbols;

storing said edited and appended data packet symbols in RAM; and repeatedly retrieving and decoding said RAM symbols, said decoding process serially processing each decoder path until its elimination.

13. A method as claimed in claim 12 wherein said method further comprises:

implementing FPGA code for multiple versions of said secondary signal M-QAM modulation types;

storing said multiple versions in said FPGA configuration memory; and manually loading one of said versions for said secondary signal into said FPGA, said selecting based on current communication objective.

14. A method as claimed in claim 12 wherein said method further comprises:

implementing FPGA code for multiple versions of said secondary signal M-QAM modulation types;

storing said multiple versions in said FPGA configuration memory; and automatically loading one of said versions for said secondary signal into said FPGA, said selecting based on automatic negotiations between two users.

* * * * *